Figure 1:
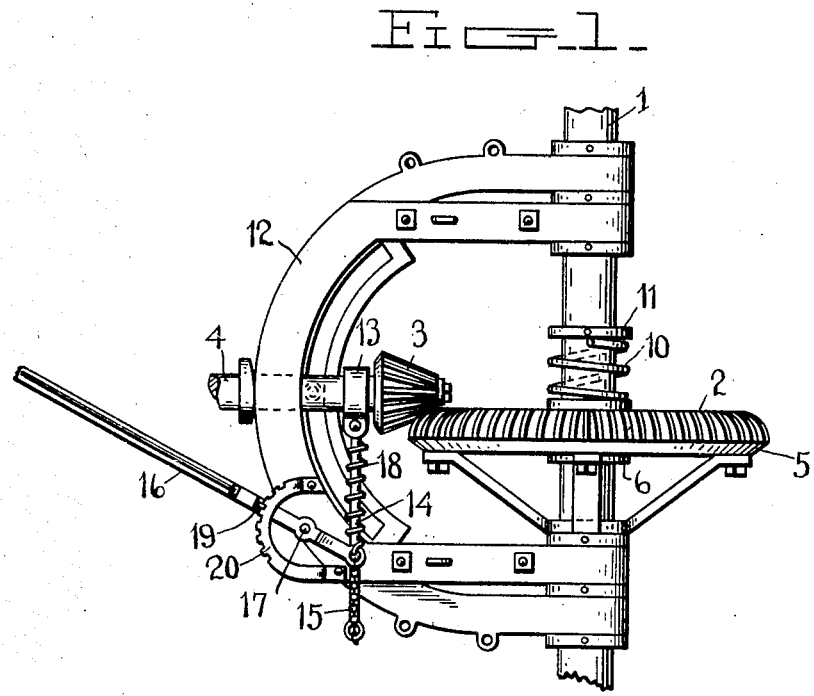

E. C. GESCHE.
GEARING.
APPLICATION FILED DEC. 18, 1908.

925,769.  Patented June 22, 1909.

Witnesses
L. B. James
H. McCartney

Inventor
Eugene C. Gesche
By Chandlee & Chandlee
Attorney

UNITED STATES PATENT OFFICE.

EUGENE C. GESCHE, OF SEGUIN, TEXAS.

GEARING.

No. 925,769.   Specification of Letters Patent.   Patented June 22, 1909.

Application filed December 18, 1908. Serial No. 468,196.

*To all whom it may concern:*

Be it known that I, EUGENE C. GESCHE, a citizen of the United States, residing at Seguin, in the county of Guadalupe, State of Texas, have invented certain new and useful Improvements in Gearing; and I do hereby declare the following to be a full, clear, and exact description of the invention, such as will enable others skilled in the art to which it appertains to make and use the same.

The present invention has reference to improvements in gearing, and it resides primarily in the production of an extremely simple and effective gear construction arranged for attachment to the driving axle of a cotton chopper or other machine, and comprising a loose outer member formed with an annular seat and with an annular series of ratchet teeth located adjacent the same, and a fast inner member designed to fit in the seat and provided with a pair of oppositely disposed pawls, the inner member being held in place in said seat with its pawls engaged with the ratchet teeth by means of a spring carried by the axle and arranged to bear against the outer member.

The invention further resides in the formation upon the outer gear member of a series of curved teeth which mesh with the teeth of a gear secured to a shaft arranged for a slight lateral or sidewise swinging movement with reference to the axle, the curving of the first-mentioned series of teeth permitting the two gears to remain in mesh with each other during such movement.

The preferred embodiment of the invention is illustrated in the accompanying drawings, in which corresponding parts are designated by the same reference numerals throughout the several views, wherein—

Figure 2:
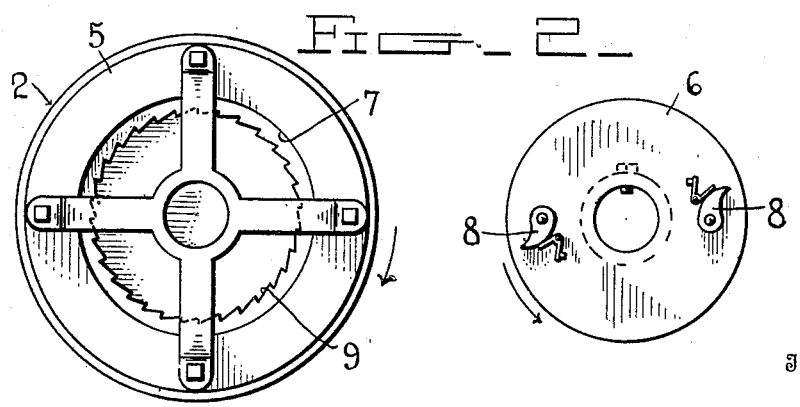

Figure 1 is a fragmental plan view showing the application of the invention as a whole to a cotton chopper. Fig. 2 is a collective view of the members of the driving gear, said members being shown in rear elevation.

Before proceeding with the detailed description of the invention, it may be stated that the same is designed primarily for use in connection with a cotton chopping machine of the type shown and described in my prior application filed April 6, 1908, Serial Number 425,494, of which application the present case is a division.

Referring more particularly to the drawings, 1 designates the front or driving axle of the chopper, 2 the main driving gear carried thereby, and 3 the beveled gear secured to the forward end of an axially arranged shaft 4, this last mentioned shaft being capable of a slight sidewise swinging movement with reference to the axle. The devices for effecting such movement, however, form no part of the present invention, and hence are neither shown nor described in this application.

The gear 2 comprises, as shown in Fig. 2, an annular outer member 5 which is loosely mounted upon the axle, and an inner member 6 rigid upon the axle. This inner member, which normally fits in an annular seat 7 formed in the rear face of the outer member, carries at diametrically opposite points a pair of spring-pressed pawls 8 arranged to engage an annular series of ratchet teeth 9 with which the loose outer member 5 is provided, said outer member being yieldingly forced toward the stationary inner member by means of a coil spring 10 which embraces the axle and is interposed between the outer member and a collar 11 fast upon the axle. The provision of this spring will, therefore, effect the normal disposition of the inner gear member in the seat 7, and the resultant engagement of the pawls 8 with the ratchet teeth 9, in consequence of which, the rotation of the axle will be transmitted to the shaft 4 through the intermeshing of the teeth of the gear 3 with the gear teeth formed on the outer member 5 of the driving gear.

The shaft 4 which carries the gear 3 has its front end projecting between the spaced upper and lower horizontal members of a yoke 12 pivoted to the axle, and is provided adjacent said gear, with a collar 13. This collar is formed with an ear to which is pivoted the inner end of an endwise movable rod 14, said rod extending transversely across the right hand arm of the yoke, and having secured to its outer end one end of a chain 15 whose other end is fastened to the front end of a lever 16. The lever which is pivoted in close proximity to its front end to an upright pin 17 set into the top member of the yoke, has also connected to said end one end of a retractile coil spring 18 which embraces the rod 14 and has its other end secured to the collar ear above referred to, the spring holding the gear 3 normally engaged with the gear member 5. As will be understood, the connection of the rod and chain with the lever and swinging shaft serves to permit the gear carried by the latter to be disengaged from the gear member in question against the tension of said spring when the lever is moved in the proper direction, the retention of the lever in adjusted position being effected by means of a spring pressed dog 19 which is designed to engage a rack 20 carried by the upper yoke member.

From the foregoing, it will be apparent that the two members of the driving gear are normally held in engagement with each other by the tension of the spring 10, and also that during the time that the gear member 5 is engaged by the gear 3, the rotation of the axle will be transmitted to the shaft 4, thus operating the chopping mechanism (not shown) carried by said shaft. Furthermore, it will be obvious that the shifting or swinging movement of the shaft incidental to the steering of the machine will not result in the unmeshing of the gear and gear member, since the curvature of the teeth of the latter permits said gear and gear member to remain engaged irrespective of the angle of the shaft to the axle.

What is claimed is:—

1. The combination with a driving shaft and a yoke carried thereby and comprising spaced upper and lower horizontal members, of a driving gear carried by said shaft and formed with a series of curved teeth; a gear in mesh with the driving gear; and a laterally-shiftable shaft by which the second named gear is carried, said shaft having its forward end projecting through the space between the yoke members, the curvature of the teeth of said driving gear permitting said gears to remain in mesh with each other during the shifting movement of the second named shaft.

2. The combination, with a driving shaft and a yoke carried thereby, of a driving gear carried by said shaft; a gear in mesh with the driving gear; a shaft by which the second named gear is carried, said shaft having its forward end supported by the yoke; a lever pivoted to the yoke; and connections between said lever and the second named shaft, for moving the latter bodily sidewise to unmesh said gears.

3. The combination, with a driving shaft and a yoke carried thereby and comprising spaced upper and lower members, of a drive gear carried by the shaft; a gear in mesh with the drive gear; a shaft by which the second named gear is carried, said shaft having its forward end projecting through the space between the yoke members; a lever pivoted to one member of the yoke; and connections between said lever and the second named shaft, for moving the latter bodily sidewise, to unmesh said gears.

4. The combination with a driving shaft and a yoke carried thereby, of a driving gear carried by said shaft; a gear in mesh with the driving gear; a shaft by which the second named gear is carried, said shaft having its forward end supported by the yoke; a lever pivoted to said yoke; and a rod disposed transversely of the yoke and connected at one end with the second named shaft, and at the other end with the lever, for moving said second named shaft bodily sidewise, when said lever is moved in one direction, to unmesh said gears.

5. The combination with a driving shaft, and a yoke carried thereby, of a driving gear carried by said shaft; a gear in mesh with said driving gear; a shaft by which the second named gear is carried, said shaft having its forward end supported by the yoke; a rod disposed transversely of said yoke and connected at one end with the second named shaft; a chain connected at one end with the other end of said rod; and a lever pivoted to said yoke and having the other end of said chain connected thereto, for moving the second named shaft bodily sidewise, to unmesh said gears.

In testimony whereof, I affix my signature, in presence of two witnesses.

EUGENE C. GESCHE.

Witnesses:
S. WOODALL,
F. J. WILLIAMSON.